(12) United States Patent
Kawana et al.

(10) Patent No.: US 9,360,849 B2
(45) Date of Patent: Jun. 7, 2016

(54) NUMERICAL CONTROL METHOD

(75) Inventors: Akira Kawana, Aiko-Gun (JP); Norio Mori, Aiko-Gun (JP); Mitsunari Oda, Aiko-Gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 398 days.

(21) Appl. No.: 13/824,305

(22) PCT Filed: Oct. 26, 2011

(86) PCT No.: PCT/JP2011/074728
§ 371 (c)(1),
(2), (4) Date: Mar. 15, 2013

(87) PCT Pub. No.: WO2012/057235
PCT Pub. Date: May 3, 2012

(65) Prior Publication Data
US 2013/0173026 A1  Jul. 4, 2013

(30) Foreign Application Priority Data

Oct. 27, 2010 (JP) ................. 2010-241038

(51) Int. Cl.
*G05B 13/02* (2006.01)
*G05B 5/01* (2006.01)
(Continued)

(52) U.S. Cl.
CPC ............... *G05B 13/024* (2013.01); *G05B 5/01* (2013.01); *G05B 19/19* (2013.01); *G05B 19/416* (2013.01); *G05B 2219/36176* (2013.01); *G05B 2219/42114* (2013.01)

(58) Field of Classification Search
CPC ...... G05B 19/18; G05B 19/182; G05B 19/19; G05B 19/351; G05B 19/401; G05B 19/402; G05B 19/404; G05B 19/416; G05B 19/4163; G05B 19/4166
USPC ........... 700/28–30, 32, 33, 37, 44, 45, 67, 69, 700/71, 79, 80, 117, 159, 170, 173, 186, 700/188, 193, 302; 318/560, 561, 567, 569, 318/600, 611, 632, 638, 651, 652, 671, 685
See application file for complete search history.

(56) References Cited

U.S. PATENT DOCUMENTS 4,338,659 A * 7/1982 Kurakake ................. 700/193
5,396,434 A * 3/1995 Oyama et al. ............ 700/193
(Continued)

FOREIGN PATENT DOCUMENTS

JP   8-249067   9/1996
JP   10-91210   4/1998
(Continued)

OTHER PUBLICATIONS

International Search Report mailed Jan. 31, 2012, directed to International Application No. PCT/JP2011/074728; 12 pages.

*Primary Examiner* — Crystal J Barnes-Bullock
(74) *Attorney, Agent, or Firm* — Morrison & Foerster LLP

(57) ABSTRACT

In this numerical control method that drives the feed shaft of a machine tool (10) by means of a servo control unit (52), a transmission function is determined by modeling the operation of the servo control unit (52) of the feed shaft, the closed loop transmission function ($G_{BP}$) of the position loop and/or the closed loop transmission function of the velocity loop of the servo control unit (52) of the machine tool is measured using the frequency response of the feed shaft, the control subject ($P_P$) of the position loop and/or the control subject of the velocity loop is determined using the measured closed loop transmission function, the position loop modeling error ($\Delta P_P$) and/or the velocity loop modeling error is determined from the control subject, and at least one control parameter of the servo control unit (52) is calculated using the closed loop transmission function and/or the modeling error. As a result, the optimum plurality of control parameters corresponding to the state of the feed shaft is determined easily and automatically.

5 Claims, 15 Drawing Sheets

(51) Int. Cl.
    *G05B 19/19*         (2006.01)
    *G05B 19/416*       (2006.01)

(56) References Cited

U.S. PATENT DOCUMENTS

| | | | | |
|---|---|---|---|---|
| 5,475,291 | A * | 12/1995 | Yoshida | G05B 13/024 318/560 |
| 7,030,585 | B2 * | 4/2006 | Iwashita et al. | 318/567 |
| 7,084,596 | B2 * | 8/2006 | Iwashita et al. | 318/638 |
| 7,366,576 | B2 * | 4/2008 | Tanahashi et al. | 700/61 |
| 7,560,890 | B2 * | 7/2009 | Terada | G05B 5/01 318/560 |
| 8,082,048 | B2 * | 12/2011 | Eguchi | 700/70 |
| 8,723,472 | B2 * | 5/2014 | Takeuchi et al. | 318/632 |
| 9,144,869 | B2 * | 9/2015 | Sato | B23Q 5/28 |
| 2009/0171594 | A1 | 7/2009 | Norihisa | |

FOREIGN PATENT DOCUMENTS

| | | |
|---|---|---|
| JP | 2004-202594 | 7/2004 |
| JP | 2007-115000 | 5/2007 |
| JP | 2007-299122 | 11/2007 |
| JP | 2008-310651 | 12/2008 |
| JP | 2009-154274 | 7/2009 |

* cited by examiner

Fig. 11
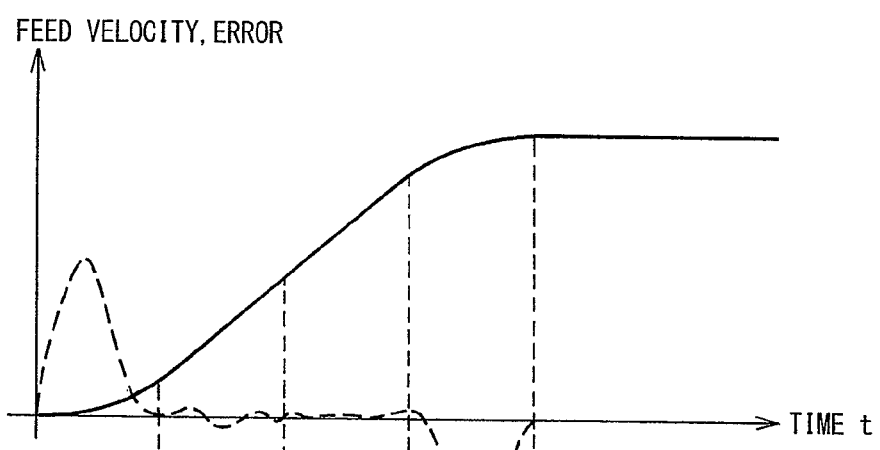
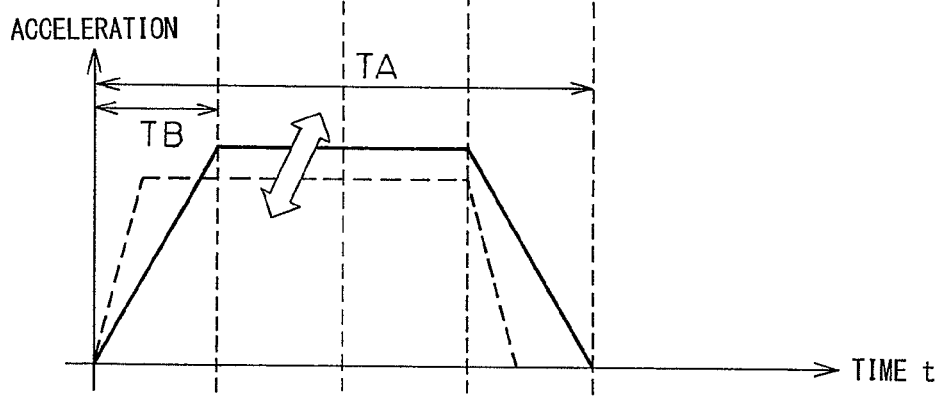

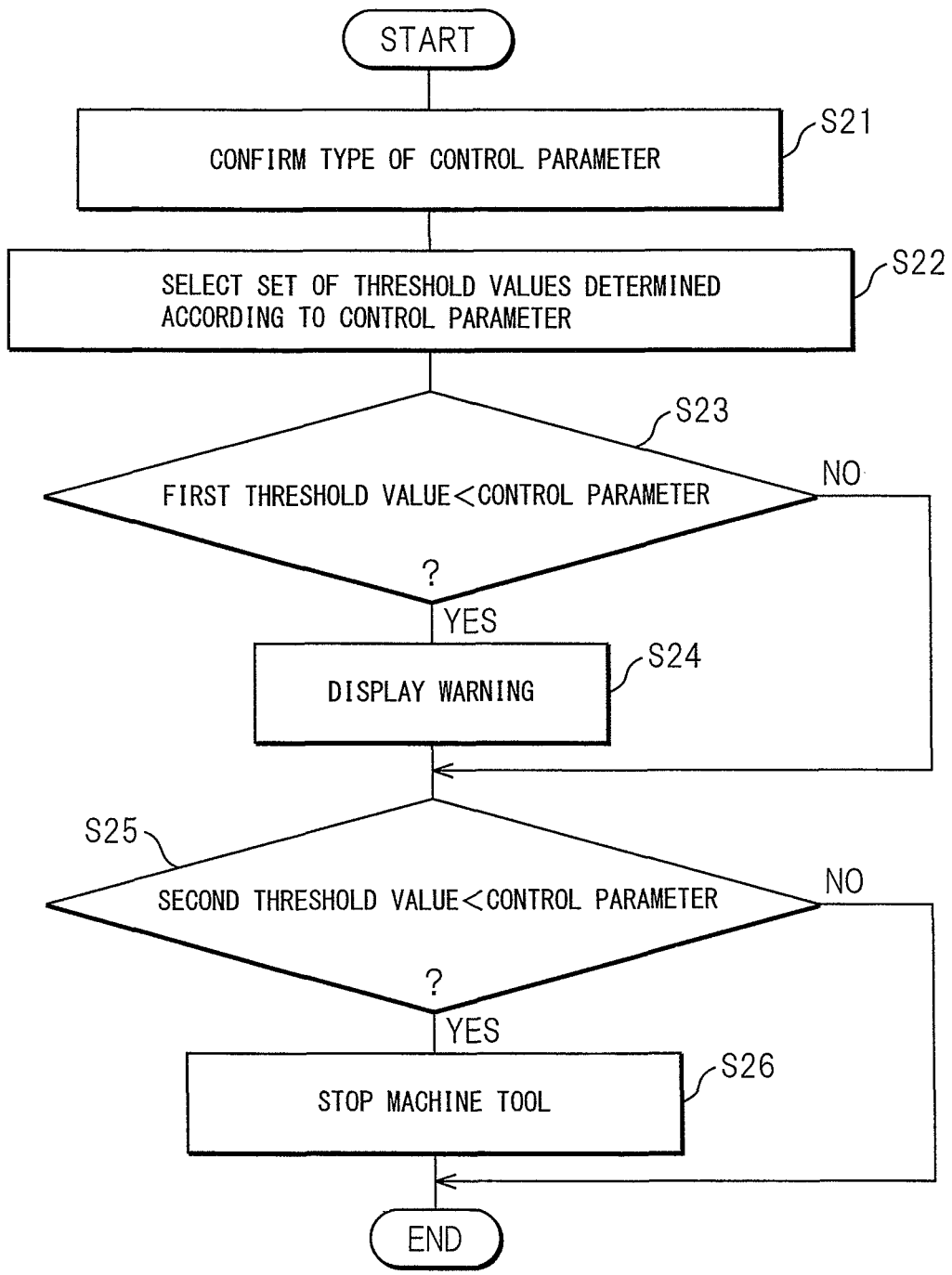

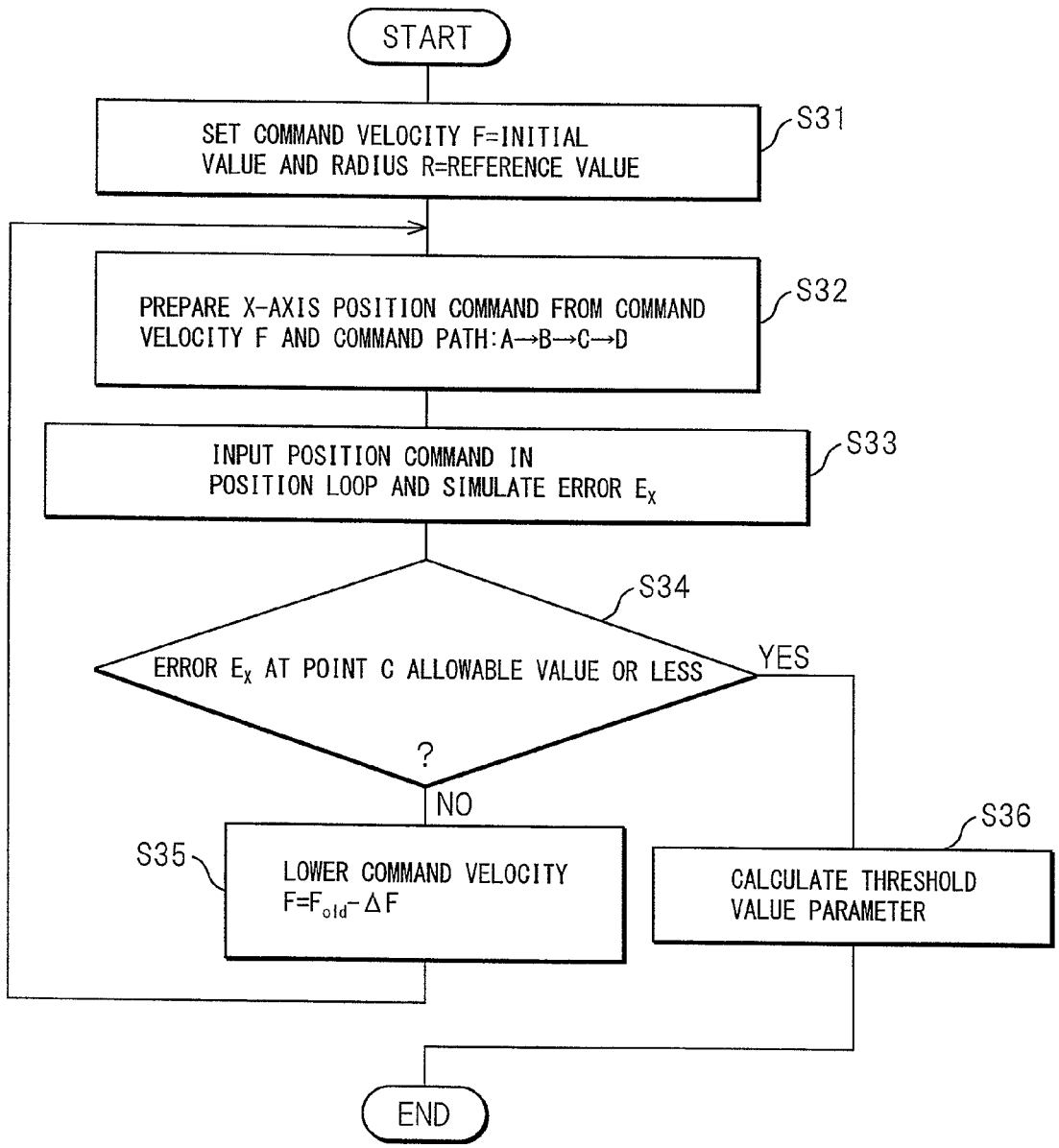

NUMERICAL CONTROL METHOD

REFERENCE TO RELATED APPLICATIONS

This application is the national stage application under 35 USC 371 of International Application No. PCT/JP2011/074728, filed Oct. 26, 2011, which claims the priority of Japanese Patent Application No. 2010-241038, filed Oct. 27, 2010, the entire contents of which are incorporated herein by reference.

FIELD OF THE INVENTION

The present invention relates to a numerical control method which uses a servo control unit to drive a feed axis of a machine tool. In particular, the present invention relates to a numerical control method of a machine tool which is provided with a plurality of feed axes.

BACKGROUND OF THE INVENTION

A machine tool includes one or more linear axes and/or rotary feed axes (below, these linear axes and rotary feed axes sometimes being simply referred to as the "feed axes"). The motors for driving these feed axes are controlled by a numerical control device. In a machine tool, different tools are attached depending on the content of the machining of a workpiece. Further, the jigs used for attaching workpieces to the machine tool differ according to the workpieces.

In a system which includes such a machine tool, the feed axes have to be set with control parameters such as acceleration/deceleration time constants, reversal correction values, various types of gains and resonance filter constants. PLT 1 discloses to adjust a feedback compensator (integral gain) as a control parameter by the time response of a motor and an ideal response error. Further, PLT 2 discloses to calculate a machine damage coefficient and to compare this with a threshold value so as to judge for abnormalities.

PLT 1: Japanese Unexamined Patent Publication No. 2007-299122A
PLT 2: Japanese Unexamined Patent Publication No. 2009-154274A

SUMMARY OF THE INVENTION

Technical Problem

However, in PLT 1, the feedback compensator has to be repeatedly adjusted, so the processing takes time. It is difficult to perform the adjustment frequently. Further, PLT 1 does not disclose setting control parameters other than the feedback compensator. Furthermore, it does not disclose to automatically set the acceleration/deceleration parameters (acceleration, rate of change of acceleration, and required time at time of acceleration and deceleration) suitable for a current state of the feed axes.

Furthermore, in PLT 2, only specific abnormalities are judged through the machine damage coefficient. It is not possible to detect abnormalities which cannot be judged by the machine damage coefficient. For this reason, the reliability of judgment for abnormalities which is disclosed in PLT 2 is relatively low. It is desired to raise the reliability of judgment for abnormalities through more multifaceted judgment.

The present invention was made in consideration of such a situation and has as its object to provide a numerical control method which can simply find a plurality of optimal control parameters and acceleration/deceleration parameters corresponding to the states of the feed axes and which can judge for abnormalities with a high reliability.

Solution to Problem

To achieve the above-mentioned object, according to a first aspect of the invention, there is provided a numerical control method which uses a servo control unit to drive a feed axis of a machine tool, the numerical control method comprising steps of creating a model of the operation of the servo control unit of the feed axis to find transfer functions, measuring at least one of a closed loop transfer function of a position loop and a closed loop transfer function of a velocity loop at the servo control unit of the machine tool by using a frequency response of the feed axis, finding at least one of a control coverage of the position loop and a control coverage of the velocity loop by using the measured closed loop transfer function, finding at least one of a modeling error of the position loop and a modeling error of the velocity loop from the control coverage, and calculating at least one control parameter of the servo control unit by using at least one of the closed loop transfer functions and modeling errors.

According to a second aspect of the invention, there is provided the first aspect of the invention which uses the modeling error of the position loop to find a feed forward gain of the position loop as a control parameter or uses the modeling error of the velocity loop to find a feed forward gain of the velocity loop as a control parameter.

According to a third aspect of the invention, there is provided the first aspect of the invention which finds a feedback gain of the position loop from the closed loop transfer function of the position loop and the modeling error of the position loop by using the small gain theorem or finds the feedback gain of the velocity loop from the closed loop transfer of the velocity loop and the modeling error of the velocity loop by using the small gain theorem.

According to a fourth aspect of the invention, there is provided the first aspect of the invention which finds the closed loop transfer function of the position loop in the servo control unit of the machine tool, inputs a plurality of sets which include at least predetermined accelerations and times in the closed loop transfer function of the position loop, and selects as acceleration/deceleration parameters one set which includes at least acceleration and time from the plurality of sets so that an error between a position command and an actual position of the feed axis becomes a desired value or less.

According to a fifth aspect of the invention, there is provided the first aspect of the invention which compares the calculated control parameter and a predetermined threshold value for that control parameter and issues a warning when the control parameter is the threshold value or more.

Advantageous Effects of Invention

In the first aspect of the invention, closed loop transfer functions and/or modeling errors which are obtained by creating a model of the operation of the servo control unit are used, so it is possible to quickly and automatically find a plurality of types of optimal control parameters.

In the second aspect of the invention, it is possible to find the feed forward gain of the position loop or the feed forward gain of the velocity loop as the control parameter.

In the third aspect of the invention, it is possible to find the feedback gain of the position loop or the feedback gain of the velocity loop as the control parameter.

In the fourth aspect of the invention, it is possible to set suitable acceleration/deceleration parameters (acceleration, rate of change of acceleration, and required time at time of acceleration or deceleration) in accordance with the state of the feed axis. Further, such settings can be performed automatically, so it is possible to shorten the machining time by a machine tool as a whole.

In the fifth aspect of the invention, the plurality of types of optimal control parameters can be used to judge for abnormalities, so abnormalities can be judged in a multifaceted manner and the reliability of that judgment can be raised. Further, such judgment for abnormalities can be performed automatically, so it is possible to lighten the load on the operator. Note that, the threshold value is made different depending on the type of the workpiece to be machined, the mass of the tool, etc.

BRIEF DESCRIPTION OF THE DRAWINGS

FIG. 11A is a view which shows a relationship of feed velocity of the feed axis and time.

FIG. 11B is a view which shows a relationship of acceleration and time.

FIG. 11C is a view which shows a table of acceleration, time, etc.

FIG. 12 is a flow chart which shows processing for judging for abnormalities based on a control parameter.

FIG. 16 A flow chart for calculating a threshold parameter of FIG. 14.

DETAILED DESCRIPTION OF THE INVENTION

Below, referring to the attached drawings, embodiments of the present invention will be explained. In the following drawings, similar members are assigned similar reference notations. To facilitate understanding, these drawings are suitably changed in scale.

Figure 1:
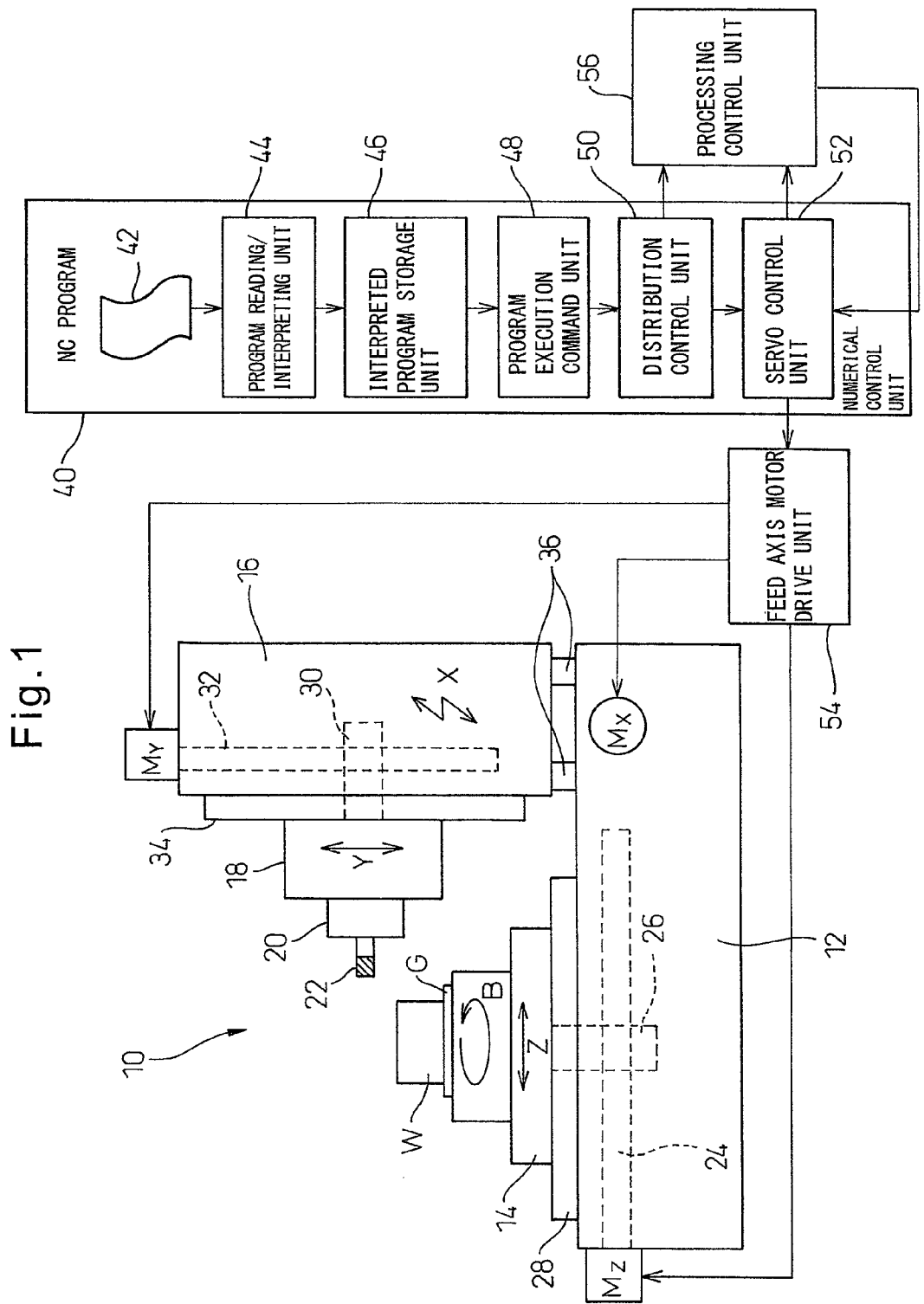
FIG. 1 A schematic view of a numerical control machine tool of the present invention.

FIG. 1 is a schematic view of a numerical control machine tool of the present invention. In FIG. 1, the numerical control machine tool 10 is a so-called horizontal machining center and is provided with a bed 12 which is set on the floor surface of a factory etc. On the top surface of the bed 12, Z-axis guide rails 28 are laid in the horizontal Z-axis direction (in FIG. 1, left-right direction). On the Z-axis guide rails 28, a table 14 for fastening a workpiece W through a workpiece-use jig G is slidably attached. FIG. 1 shows an example of a table 14 on which is fastened an NC rotary table which enables rotational feed in a B-axis direction and carries a workpiece W, but it is also possible to place the workpiece W directly on the table 14 without interposition of a NC rotary table.

On the top surface of the bed 12, furthermore, X-axis guide rails 36 are laid perpendicularly intersecting the Z-axis in a horizontal X-axis direction (direction vertical to paper surface in FIG. 1). On the X-axis guide rails 36, a column 16 is slidably attached. At the front surface of the column 16 which faces the workpiece W, Y-axis guide rails 34 are laid in a Y-axis direction (in FIG. 1, top-bottom direction) which perpendicularly intersects the X-axis and Z-axis. On the Y-axis guide rails 34, a spindle head 18 which supports a spindle 20 to be able to rotate is slidably attached.

Inside of the bed 12 at the bottom side of the table 14, a Z-axis feed screw 24 is laid in the Z-axis direction. At the bottom surface of the table 14, a nut 26 which screws with the Z-axis feed screw 24 is fastened. At one end of the Z-axis feed screw 24, a Z-axis feed servo motor Mz is coupled. By driving the Z-axis feed servo motor Mz and making the Z-axis feed screw 24 rotate, the table 14 moves along the Z-axis guide rails 28. In the same way, inside of the bed 12 at the bottom side of the column 16, an X-axis feed screw (not shown) is laid in the X-axis direction. At the bottom surface of the column 16, a nut (not shown) which screws with the X-axis feed screw is fastened.

At one end of the X-axis feed screw, an X-axis feed servo motor Mx is coupled. By driving the X-axis feed servo motor Mx and making the X-axis feed screw rotate, the column 16 moves along the X-axis guide rails 36. Furthermore, inside of the column 16, a Y-axis feed screw 32 is laid in the Y-axis direction. At the back surface of the spindle head 18, a nut 30 which screws with the Y-axis feed screw 32 is fastened. At the top end of the Y-axis feed screw 32, a Y-axis feed servo motor My is coupled. By driving the Y-axis feed servo motor My and making the Y-axis feed screw 32 rotate, the spindle head 18 moves along the Y-axis guide rails 34.

At the front end of the spindle 20, a tool 22, for example, an end mill, is attached. By making the tool 22 rotate while making the column 16, spindle head 18, and table 14 move in the X-axis, Y-axis, and Z-axis directions, respectively, the workpiece W which is fastened on the table 14 is cut to a desired shape. When the NC rotary table is fastened, the numerical control machine tool 10 can be said to be a four-axis numerical control machine tool which further has a B-axis.

The numerical control machine tool 10 is provided with a numerical control unit 40 which controls the X-axis, Y-axis, and Z-axis feed servo motors Mx, My, and Mz which make the column 16, spindle head 18, and table 14 move in the X-axis, Y-axis, and Z-axis directions. When having an NC rotary table, it is provided with a B-axis feed servo motor (not shown).

The numerical control unit 40 includes a program reading/interpreting unit 44 which reads an NC program 42 and interprets it, an interpreted program storage unit 46 which temporarily stores the interpreted program, a program execution command unit 48 which suitably takes out a program from the interpreted program storage unit 46 and issues execution program data, a distribution control unit 50 which uses execution program data from the program execution command unit 48 as the basis to issue position command values, velocity command values, and torque command values to the X-axis, Y-axis, and Z-axis, and a servo control unit 52 which uses the position command values, velocity command values, and torque command values from the distribution control unit 50 and later explained feedback signals as the basis to issue torque command values or current command values to the feed axis motor drive unit 54. Note that, in the same way for the B-axis, the distribution control unit 50 issues a position command value, angular velocity command value, angular acceleration command value, etc. to the B-axis.

The feed axis motor drive unit 54 uses torque command values or current command values from the servo control unit 52 as the basis to output currents so as to drive the X-axis, Y-axis, and Z-axis feed axis motors Mx, My, and Mz. Furthermore, in the present embodiment, a processing control unit 56 is provided which corrects the torque command values or current command values from the servo control unit 52 to the feed axis motor drive unit 54. The processing control unit 56 plays the role of performing various types of processing such as the later explained creation of a model and calculation of a control parameter.

Figure 2:
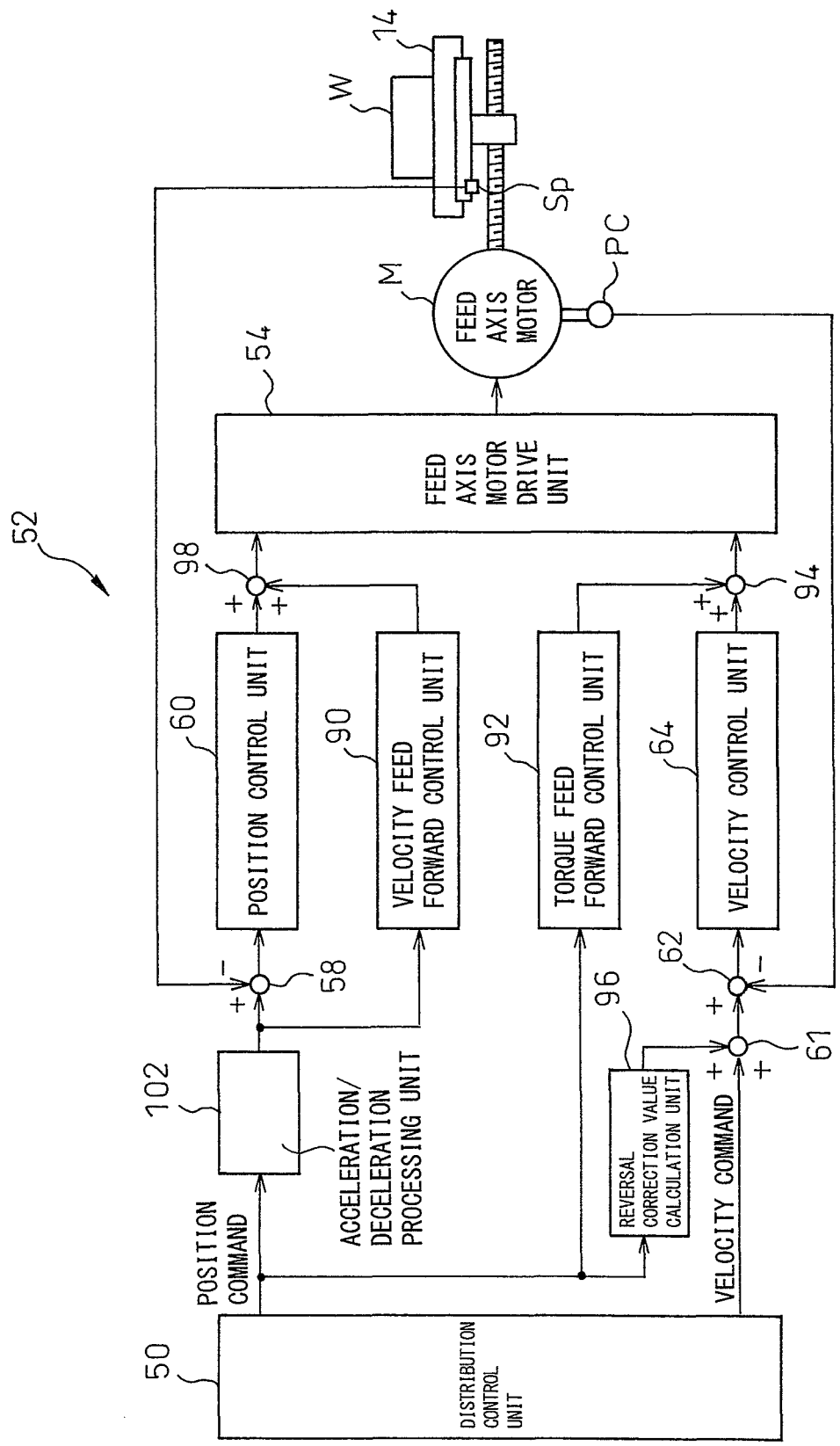
FIG. 2 A block diagram of the configuration of a servo control unit which controls a numerical control machine tool of the present invention.

FIG. 2 is a block diagram of the configuration of the servo control unit which controls the numerical control machine tool of the present invention. In the embodiment of FIG. 2, component elements which correspond to FIG. 1 are indicated by the same reference notations.

The servo control unit 52 includes an acceleration/deceleration processing unit 102 which processes the position command values from the distribution control unit 50 for acceleration/deceleration, a subtractor 58 which subtracts a position feedback signal of a digital linear scale or other position detector Sp which is attached to the table 14 from the position command values, and a position control unit 60 which uses the output from the subtractor 58 as the basis to control the position. Furthermore, the servo control unit 52 includes a reversal correction value calculation unit 96 which uses the positional command values from the distribution control unit 50 etc. as the basis to calculate correction values relating to backlash of the feed axes by a known technique. Furthermore, the servo control unit 52 includes an adder 61 which adds the calculated reversal correction values to the velocity commands which are output from the distribution control unit 50, a subtractor 62 which subtracts the velocity feedback signals from the pulse coders PC which are provided at the feed axis motors M from the velocity commands, and a velocity control unit 64 which uses the output of the subtractor 62 as the basis to control the velocity.

On the contrary, the position command values, velocity command values, and torque command values from the distribution control unit 50 are sent at each instant to the velocity feed forward control unit 90 and the torque feed forward control unit 92. The velocity feed forward control unit 90 and the torque feed forward control unit 92 use the position command values from the distribution control unit 50 as the basis to generate a velocity feed forward value and a torque feed forward value. The velocity feed forward value and the output from the position control unit 60 are added at the adder 98 and supplied to the feed axis motor drive unit 54. Furthermore, the torque feed forward value and the output from the velocity control unit 64 are added at the adder 94 and supplied to the feed axis motor drive unit 54.

Figure 3:
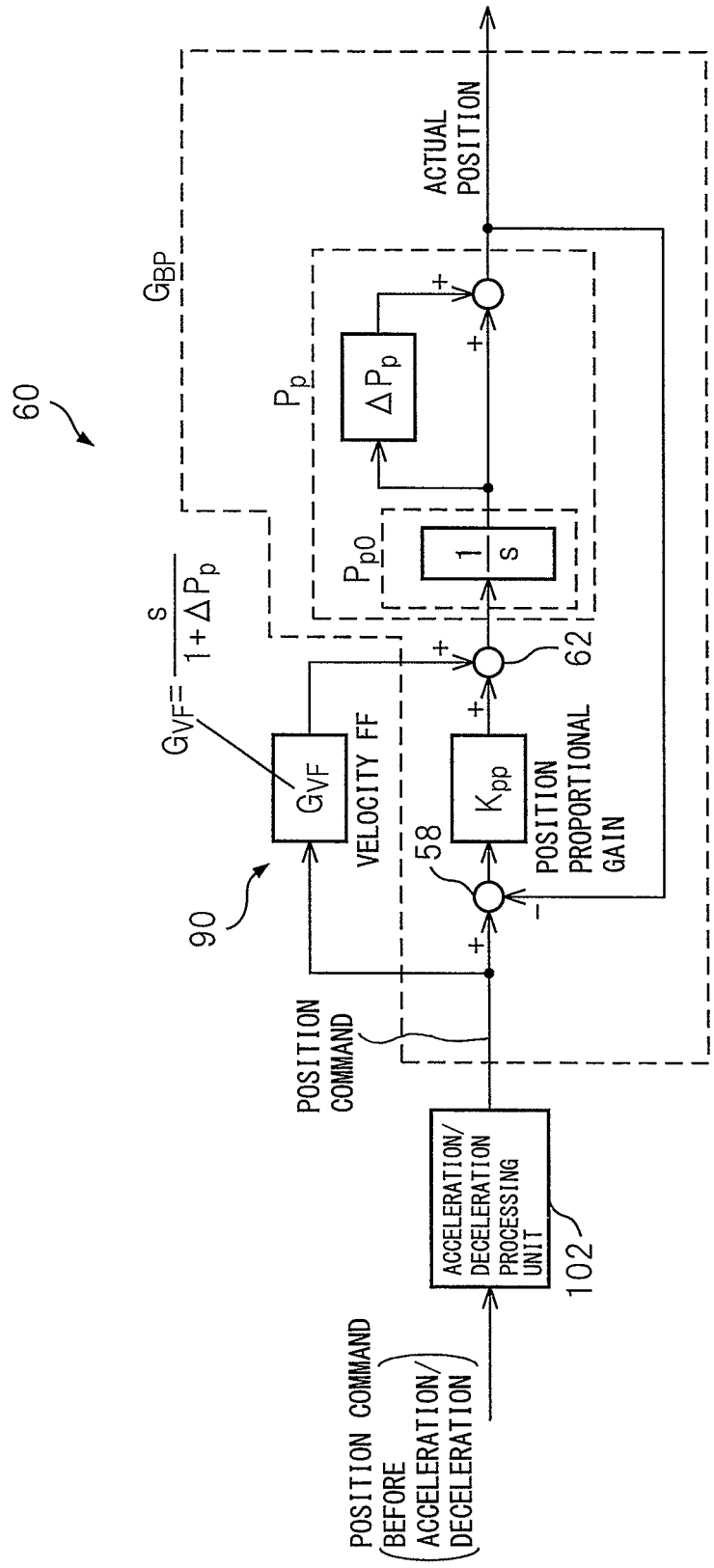
FIG. 3 A block diagram which shows a position control unit which is shown in FIG. 2 and its periphery.

FIG. 3 is a block diagram which shows the position control unit which is shown in FIG. 2 and its vicinity. As shown in FIG. 3, the output from the subtractor 58 is multiplied with the position proportional gain (feedback gain of position loop) Kpp. Further, in FIG. 3, a model of the feed forward gain of the velocity feed forward control unit 90 is created by the transfer function $G_{VF}$.

In FIG. 3, a model of the region between the position commands after acceleration/deceleration processing and the actual position which is detected by the position detector Sp is created as a closed loop transfer function $G_{BP}$ of the position loop. Furthermore, as shown in FIG. 3, inside the closed loop transfer function $G_{BP}$, a model of the control coverage $P_P$ of the position loop is created, while inside the control coverage $P_P$ of the position loop, a control coverage model $P_{P0}$ of the position loop is shown. Note that, in the figure, "s" is a Laplacian operator. Further, in FIG. 3, "$\Delta P_P$" changes depending on the state of the machine tool, while the acceleration/deceleration processing unit 102, transfer function $G_{VF}$, and position proportional gain $K_{pp}$ change by optimization.

Figure 4:
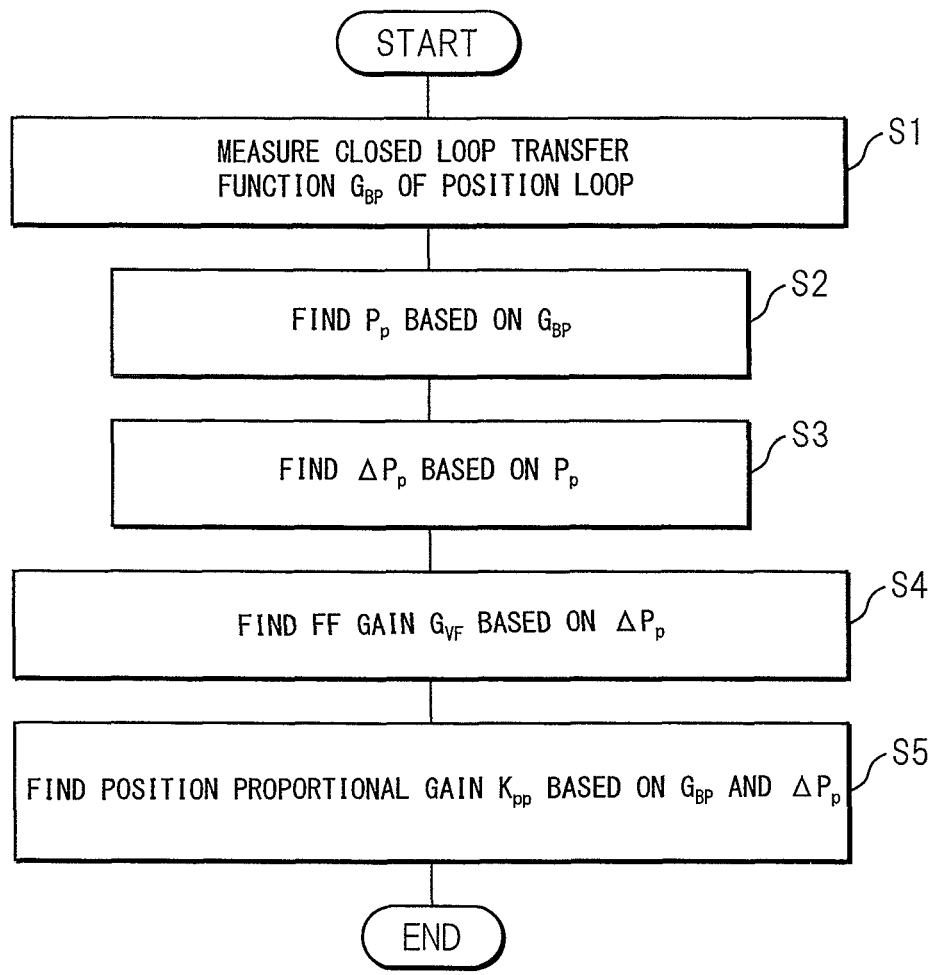
FIG. 4 A flow chart for calculating a control parameter relating to the position control unit.

FIG. 4 is a flow chart for calculating the control parameters relating to the position control unit. Note that, the following processing is assumed to be performed by the processing control unit 56. In the present invention, the processing which is shown in FIG. 4 is used to calculate control parameters of the position control unit 60 comprised of the transfer function $G_{VF}$ (feed forward gain) and position proportional gain $K_{pp}$ (feedback gain).

First, at step S1, the closed loop transfer function $G_{BP}$ of the position loop is measured. This is found from the ratio of the position commands after the acceleration/deceleration processing which is shown in FIG. 3 and the actual position which is detected by the position detector Sp.

Then, at step S2, the closed loop transfer function $G_{BP}$ of the position loop is used as the basis to find the control coverage $P_P$ of the position loop by the following formula (1):

[Equation 1]

$$P_p = \frac{G_{BP}}{K_{pp}(1 - G_{BP})} \tag{1}$$

Then, at step S3, the following formula (2) is used to find the modeling error $\Delta P_P$ from the control coverage $P_P$ of the position loop. Here, the modeling error $\Delta P_P$ means the error with respect to an actual value which occurs due to creation of a model.

[Equation 2]

$$\Delta P_p = \frac{P_p - P_{p0}}{P_{p0}} \tag{2}$$

After that, at step S4, the following formula (3) is used to calculate the feed forward gain $G_{VF}$ (see FIG. 3) based on the modeling error $\Delta P_P$.

[Equation 3]

$$G_{VF} = \frac{s}{1 + \Delta P_p} \quad (3)$$

At this time, the technique is utilized of using the following formula (4) to curve fit the modeling error $\Delta P_P$ for approximation.

[Equation 4]

$$\Delta_{cf}(S) = \frac{m_n s^n + m_{n-1} s^{n-1} + \ldots + m_1 s + m_0}{d_n s^n + d_{n-1} s^{n-1} + \ldots + d_1 s + d_0} \quad (4)$$

S: Laplacian operator
$m_n$: coefficient of numerator $s^n$ term
$d_n$: coefficient of denominator $s^n$ term Specifically, the group of data of the modeling error is used for approximation by the n-th order transfer function $\Delta_{cf}(s)$. In the present invention, for the purpose of approximation, the differential iteration method is used to find the coefficients of the transfer function. Note that, the calculation time is determined in accordance with the value of the order "n". When the order "n" is relatively small, the calculation time can be shortened, but the precision at the high frequency side is poor.

Figure 5A:
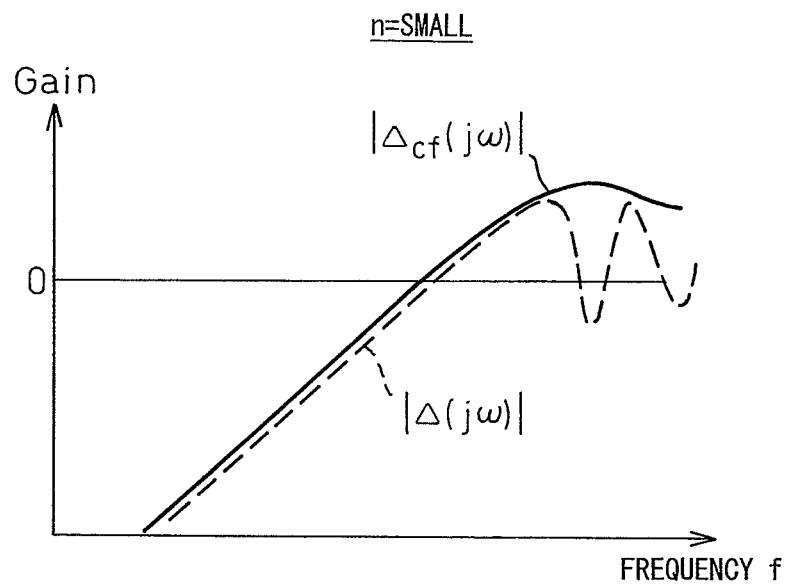
FIG. 5A A first view which shows a technique of curve fitting modeling error for approximation.

FIG. 5A is a first view which shows the technique of curve fitting of modeling error for approximation. The ordinate shows the gain (db), while the abscissa shows the frequency "f" (Hz). As shown in FIG. 5A, the transfer function $\Delta_{cf}(s)$ for approximation generally matches the actual modeling error $\Delta$ at the low frequency side, but is greatly offset from the modeling error $\Delta$ at the high frequency side.

[Equation 5]

$$|\Delta| < |T^{-1}| \quad (5)$$

Figure 5B:
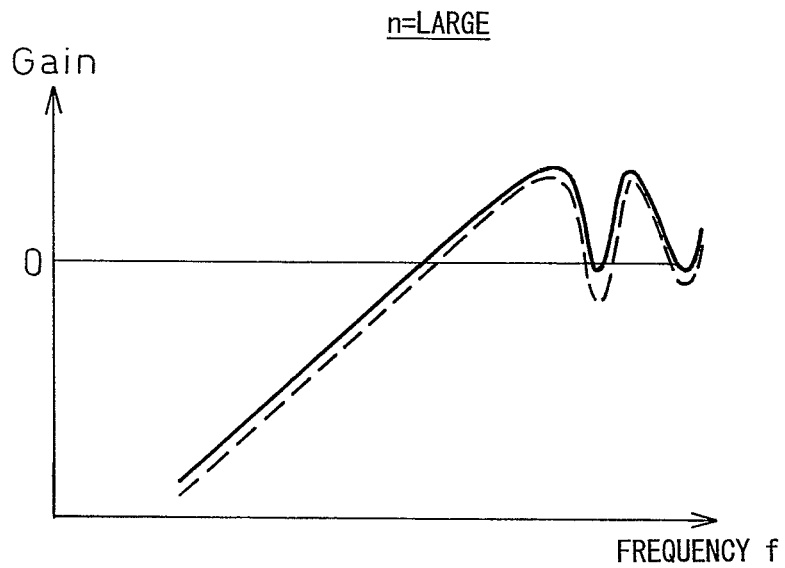
FIG. 5B A second view which shows a technique of curve fitting modeling error for approximation.

As opposed to this, when the order "n" is relatively large, as shown in FIG. 5B, which is a figure similar to FIG. 5A, the transfer function $\Delta_{cf}(s)$ generally matches the actual modeling error $\Delta$ in all frequency regions. However, if the order "n" is large, the calculation takes time, so this is determined by considering the processing capability of the processing control unit 56. The thus obtained transfer function $\Delta_{cf}(s)$ is used as the modeling error $\Delta P_P$ to find the feed forward gain $G_{VF}$ from formula (3).

Finally, in FIG. 4 at step S5, the small gain theorem is used to find the position proportional gain $K_{pp}$ by the formula (5) based on the closed loop transfer function $G_{BP}$ and modeling error $\Delta P_P$ of the position loop. From the relationship derived by the small gain theorem, the stability is evaluated by whether the reciprocal of the closed loop transfer function (in formula (5), made "T") is larger than the modeling error $\Delta$ seen in terms of the frequency response in all frequency regions.

Figure 6:
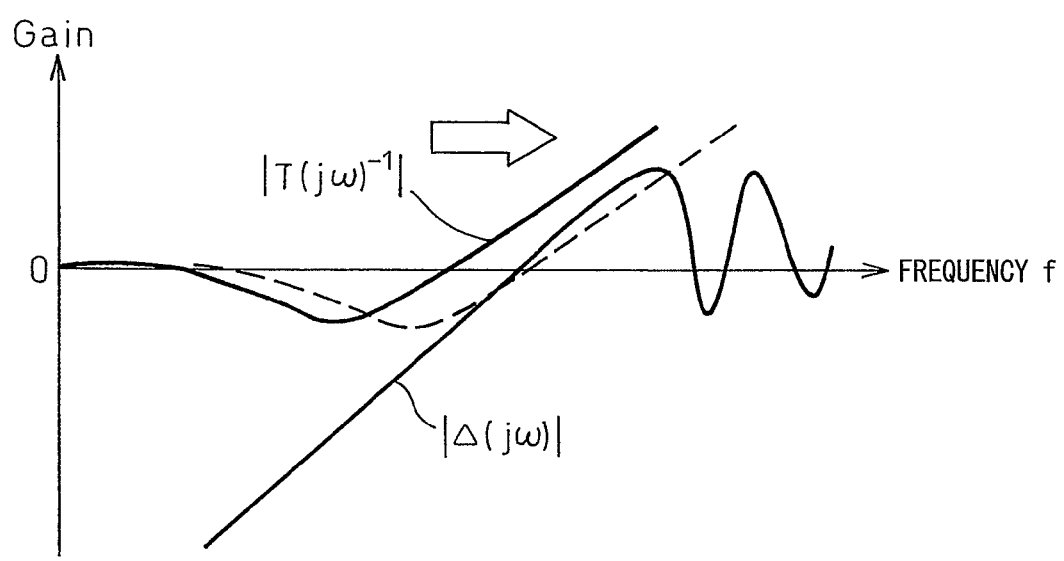
FIG. 6 A view for explaining using a small gain theorem to find feedback gain from modeling error.

FIG. 6 is a view for explaining using the small gain theorem to find the feedback gain from the modeling error. In FIG. 6, the ordinate shows the gain (db), while the abscissa shows the frequency "f" (Hz). Here, the reciprocal of the closed loop transfer function T is preferably close to the modeling error $\Delta$, while the reciprocal of the closed loop transfer function T is desirably made to shift toward the modeling error $\Delta$ in the arrow direction.

However, as shown in FIG. 6 by the broken line, if at least part of the reciprocal of the closed loop transfer function T crosses the modeling error $\Delta$, a region is formed where the modeling error $\Delta$ is larger than the reciprocal of the closed loop transfer function T. In this case, the small gain theorem is no longer satisfied and the machine stability is impaired. Therefore, the reciprocal of the closed loop transfer function T is set near the modeling error $\Delta$ without crossing or touching the modeling error $\Delta$ (please see solid line of FIG. 6). In this way, the closed loop transfer function $G_{BP}$ of the position loop is determined and the formula (1) etc. are used to calculate the position proportional gain $K_{pp}$.

Figure 7:
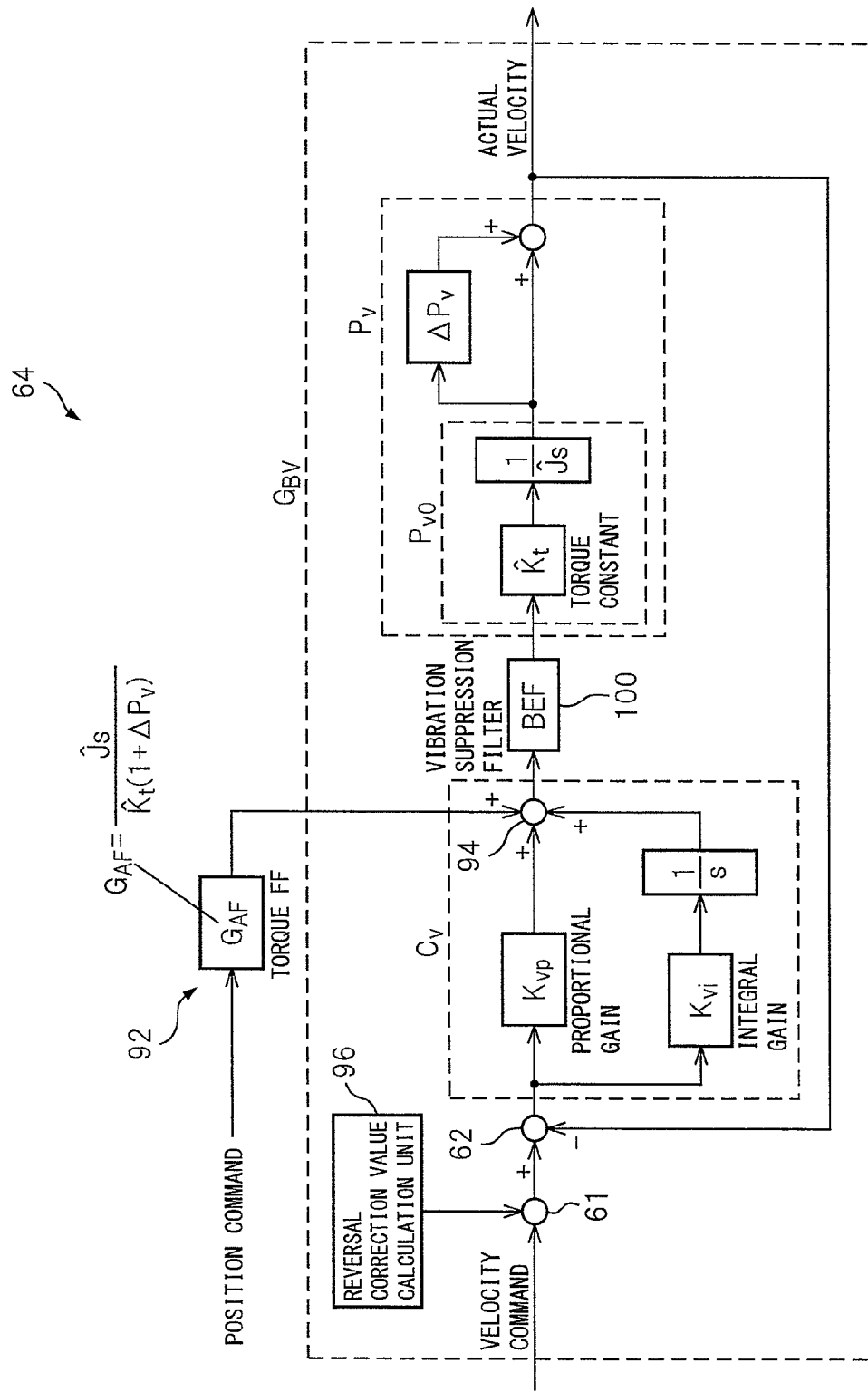
FIG. 7 A block diagram which shows a velocity control unit which is shown in FIG. 2 and its periphery.

FIG. 7 is a block diagram which shows the velocity control unit which is shown in FIG. 2 and its vicinity. In FIG. 7, the reversal correction values which were prepared by the reversal correction value calculation unit 96 are added at the adder 61 to the velocity commands and, furthermore, the velocities which were detected at the pulse coders PC are subtracted at the subtractor 62. Such velocity commands are input to a controller $C_v$ of the velocity loop ($=K_{vp} \cdot K_{vi}/s$).

As shown in FIG. 7, at the controller $C_v$ of the velocity loop, the output from the subtractor 62 is branched. On the one hand, it is multiplied with the proportional gain $K_{vp}$ (first feedback gain of velocity loop), while on the other hand, it is multiplied with the integral gain $K_{vi}$ (second feedback gain of velocity loop) and the reciprocal of the Laplacian operator "s". The products are added at the adder 94. Furthermore, a model of the torque feed forward control unit 92 is created by the transfer function $G_{AF}$. Its output is also added at the adder 94 and the result is input to the vibration suppression filter 100.

In FIG. 7, a model of the region between the velocity commands from the distribution control unit 50 and the actual velocities which are detected by the pulse coders PC is created as the closed loop transfer function $G_{BV}$ of the velocity loop. Furthermore, as shown in FIG. 7, at the inside of the closed loop transfer function $G_{BV}$, a model of the control coverage $P_V$ of the velocity loop is created. Furthermore, inside the control coverage $P_V$ of the velocity loop, the control coverage model $P_{V0}$ of the velocity loop is shown. Note that, in the figure, "s" is a Laplacian operator, "J" is inertia, and "$K_t$" is a torque constant. The torque constant $K_t$, "1/Js", and "$\Delta P_V$" in FIG. 7 are assumed to change depending on the state of the machine tool, while the transfer function $G_{AF}$, proportional gain $K_{vp}$, integral gain $K_{vi}$, and vibration suppression filter 100 are assumed to change by optimization.

Figure 8:
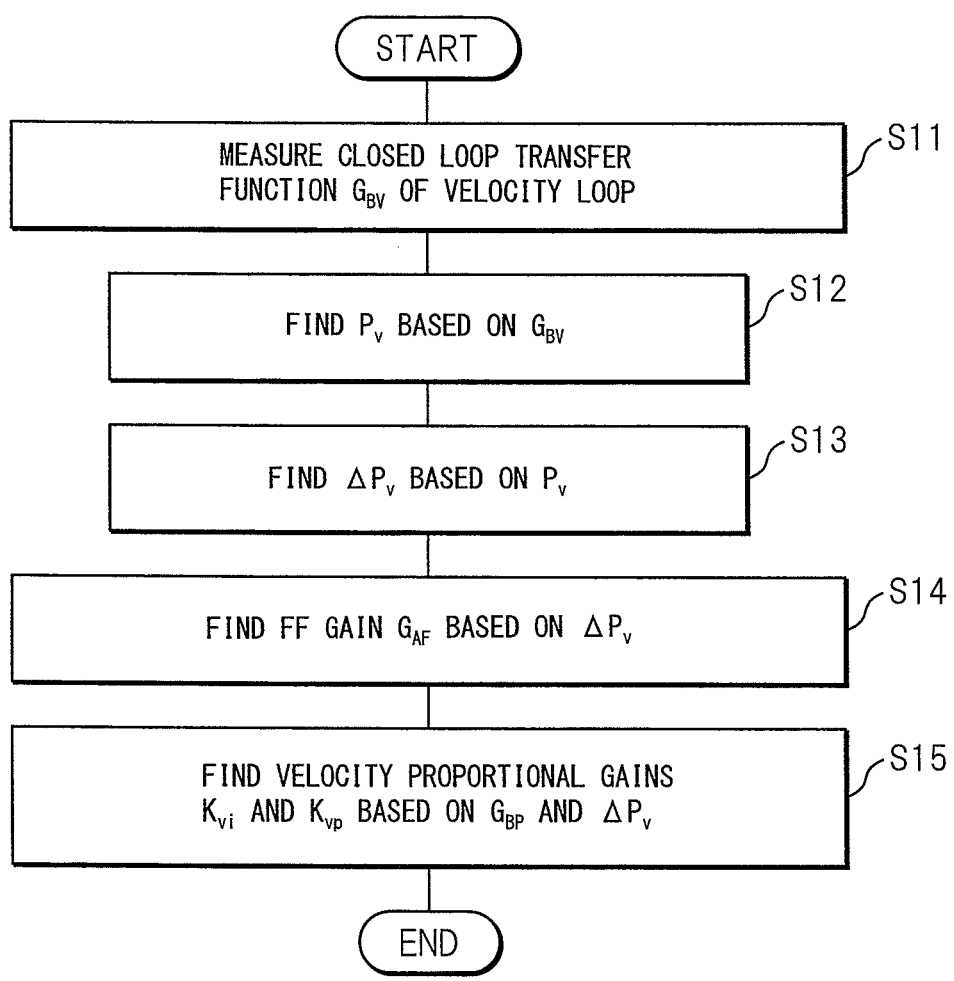
FIG. 8 A flow chart for calculating a control parameter relating to a velocity control unit.

FIG. 8 is a flow chart for calculation of a control parameter relating to the velocity control unit. Note that, the following processing is assumed to be performed by the processing control unit 56. In the present invention, the processing which is shown in FIG. 8 is used to calculate the transfer function $G_{AF}$ (feed forward gain) and proportional gain $K_{vp}$ and integral gain $K_{vi}$ (feedback gains) as control parameters of the velocity control unit 64.

First, at step S11, the closed loop transfer function $G_{BV}$ of the velocity loop is measured. This is found from the ratio of the velocity commands which are shown in FIG. 7 and the actual velocities which are detected by the pulse coders PC.

Then, at step S12, based on the closed loop transfer function $G_{BV}$ of the velocity loop, the following formula (6) is used to find the control coverage $P_V$ of the velocity loop:

[Equation 6]

$$P_v = \frac{G_{BV}}{C_v(1 - G_{BV})} \quad (6)$$

Then, at step S13, the following formula (7) is used to find the modeling error $\Delta P_V$ from the control coverage $P_V$ of the velocity loop.

[Equation 7]

$$\Delta P_v = \frac{P_v - P_{v0}}{P_{v0}} \quad (7)$$

Figure 9A:
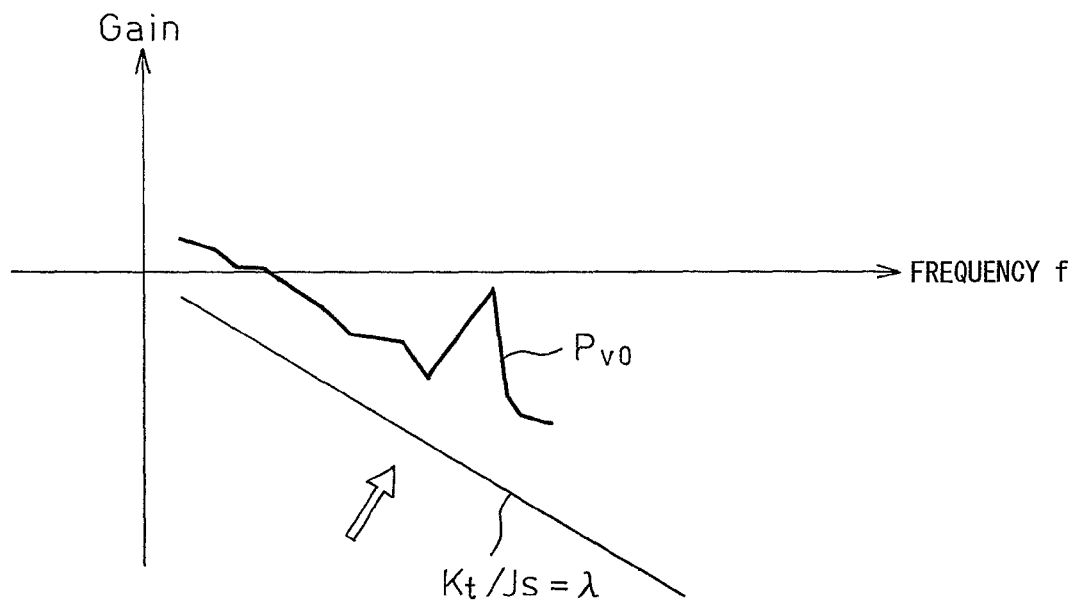
FIG. 9A A first view which shows a technique of finding modeling error of a velocity loop.
Figure 9B:
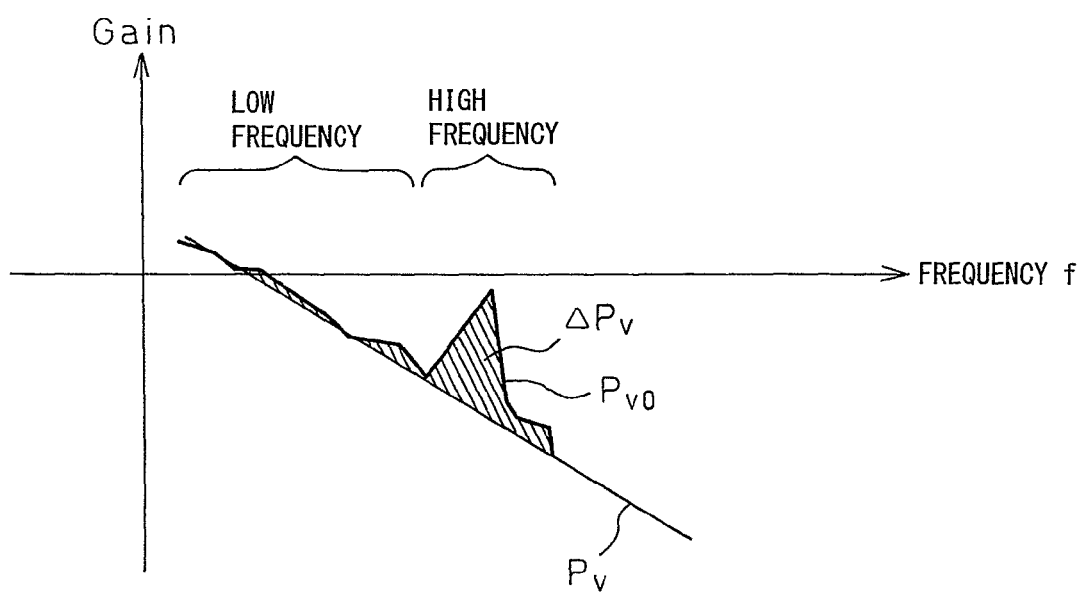
FIG. 9B A second view which shows a technique of finding modeling error of a velocity loop.

FIG. 9A and FIG. 9B are views which show the technique for finding the modeling error $\Delta P_V$ of the velocity loop. The ordinate shows the gain (db), while the abscissa shows the frequency "f" (Hz). As shown in FIG. 9A, if actually plotting the control coverage model $P_{v0}$ of the velocity loop, it will not become a straight shape and will include considerable error at the high frequency side.

For this reason, as shown in FIG. 9B, the control coverage $P_v$ of the velocity loop is set so as to match with the control coverage model $P_{v0}$ of the velocity loop at the low frequency side. Further, the region of the difference between the set control coverage $P_v$ and the control coverage model $P_{v0}$ is set as the modeling error $\Delta P_v$. Further, as can be seen from FIG. 7, in the control coverage model $P_{v0}$, the output from the vibration suppression filter 100 is multiplied with $K_t/Js$ ($=\lambda$). For this reason, the actual J (inertia) is obtained by dividing $\lambda$ by the torque constant $K_t$.

After that, at step S14, the following formula (8) is used to calculate the feed forward gain $G_{AF}$ (see FIG. 7) based on the modeling error $\Delta P_v$. At this time, in the same way as explained with reference to the formula (4), the technique of curve fitting the modeling error $\Delta P_v$ for approximation is utilized.

[Equation 8]

$$G_{AF} = \frac{\hat{J}_s}{\hat{K}_1(1 + \Delta P_v)} \quad (8)$$

Finally, at step S15, the velocity proportional gain $K_{vp}$ and integral gain $K_{vi}$ are found based on the closed loop transfer function $G_{BV}$ and modeling error $\Delta P_v$ of the velocity loop by using the small gain theorem. The method of finding these gains is generally the same as step S5 of FIG. 4, so details will be omitted. However, when making the reciprocal of the transfer function T which is shown in FIG. 6 shift toward the modeling error $\Delta$, it is necessary to prevent the reciprocal of the transfer function T from crossing the modeling error $\Delta$ by adjusting the ratio of the velocity proportional gain $K_{vp}$ and integral gain $K_{vi}$. The closed loop transfer function $G_{BV}$ of the velocity loop is determined in this way. The formula (6) etc. are used to find the velocity proportional gain $K_{vp}$ and integral gain $K_{vi}$.

In this way, in the present invention, the modeling errors $\Delta P_P$ and $\Delta P_v$ of the position loop and the velocity loop which are obtained by creating a model of the operation of the servo control unit 52 are used to calculate the feed forward gains $G_{VF}$ and $G_{AF}$. Furthermore, in the present invention, the closed loop transfer functions $G_{BP}$ and $G_{BV}$ and the modeling errors $\Delta P_P$ and $\Delta P_v$ of the position loop and the velocity loop are used to find the feedback gains $K_{pp}$, $K_{vi}$, and $K_{vp}$.

Further, these gains $G_{VF}$, $G_{AF}$, $K_{pp}$, $K_{vi}$, and $K_{vp}$ are all control parameters of the numerical control machine tool 10. In the present invention, the closed loop transfer function and/or modeling error which are obtained by creation of a model are used, so the optimal control parameters suitable for the state of the feed axis are obtained. For this reason, in the present invention, at the time of machining, it is possible to quickly and automatically find a plurality of types of control parameters by calculation. Therefore, in the present invention, it becomes possible to maintain the grade of the machined surface and shape precision of the workpiece W at high levels.

Figure 10A:
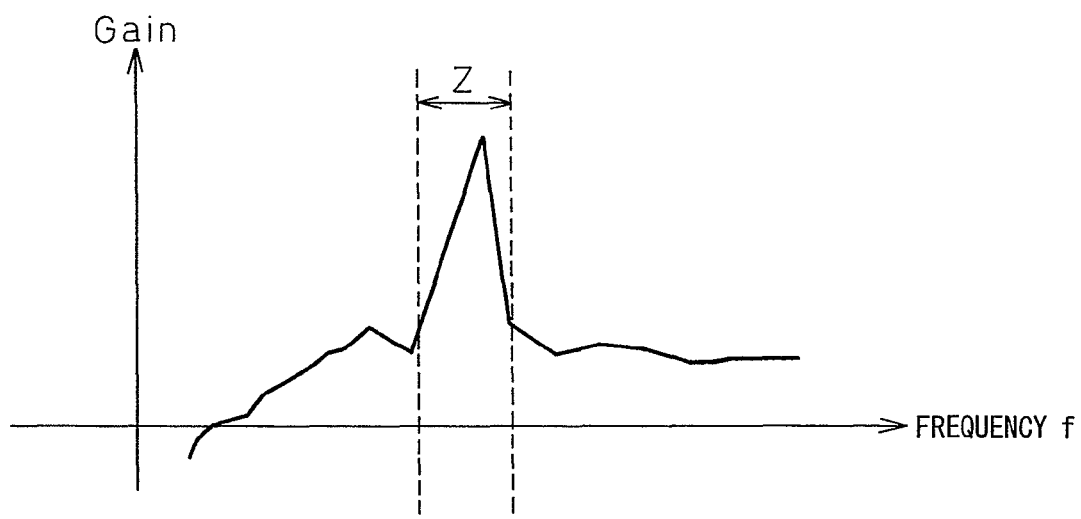
FIG. 10A A view which shows a relationship of gain and frequency.
Figure 10B:
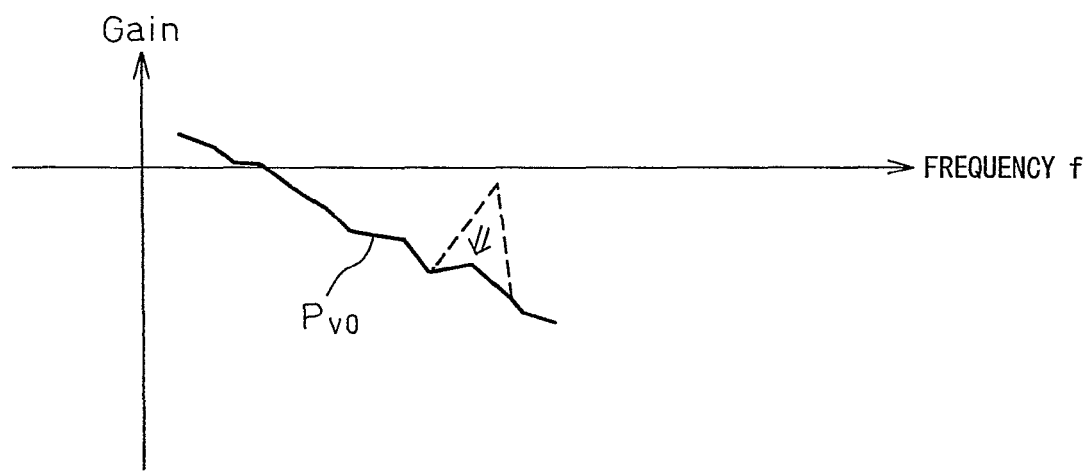
FIG. 10B A view which shows a relationship of gain and frequency.

In this regard, FIGS. 10A and 10B are views which show the relationship between the gain and the frequency. The modeling error $\Delta P_v$ is extracted from the content of FIG. 9B. As can be seen from FIG. 10A, error relatively concentrates in the region Z of the high frequency side. This region Z can be automatically easily specified from a comparison of the average value of the gains and the values of the individual gains. Therefore, if selecting the resonance filter constant of the vibration suppression filter 100 so as to suppress the value of this region Z, as shown in FIG. 10B, it is possible to prepare a control coverage model $P_{v0}$ with little error.

The resonance filter constant of this vibration suppression filter 100 is also one of the control parameters of the numerical control machine tool 10. Therefore, it will be understood that by such processing, in the present invention, a further larger number of control parameters can be automatically set.

In this regard, the feed axes are set with acceleration/deceleration parameters (acceleration, rate of change of acceleration, and required time at time of acceleration/deceleration and allowable acceleration, corner deceleration, and interpolated acceleration/deceleration), but such acceleration/deceleration parameters have to be changed in accordance with the mass of the workpiece W, that is, the load of the feed axes. Here, the "allowable acceleration" parameter is the acceleration which is defined by the radius of curvature of the tool path and the command velocity, the "corner deceleration" parameter is the deceleration velocity for suppressing position error which occurs due to the effects of the discontinuity of the acceleration at corner parts, and the "interpolated acceleration/deceleration" parameter is the time constant of the filter which is used for preventing the acceleration and the rate of change of acceleration from becoming infinitely large. In the past, a workpiece W was placed on the table 14 and the numerical control machine tool 10 was made to actually operate so as to determine the acceleration/deceleration parameters. For this reason, it has been desired to set the acceleration/deceleration parameters in accordance with the state of the feed axis automatically and at a high speed. Therefore, in the present invention, the feed axis system on a computer is used to calculate the optimal acceleration/deceleration parameters at a high speed, without making machine tool actually operate.

FIG. 11A is a view which shows the relationship between a feed velocity of a feed axis and time, while FIG. 11B is a view which shows the relationship between acceleration and time. When the feed velocity, as shown in FIG. 11A, rises from zero to a predetermined value, the acceleration, as shown in FIG. 11B, rises by a certain rate, holds steady at a predetermined value, then falls by a certain rate. When the acceleration quickly rises or falls, that is, the rate of change of acceleration is large, as shown in FIG. 11A by the broken line, sometimes the error becomes large and shaking or vibration occur.

In the present invention, as shown in FIG. 11C, a plurality of sets of the acceleration $\alpha$ and the acceleration change rate $\alpha'$ are stored in a storage unit (not shown). Here, as can be seen from FIG. 11B, the time TA shows the time for the feed velocity to change from zero to a certain value, while the time TB shows the time for the acceleration $\alpha$ to change from zero to a certain value.

Further, the sets comprised of the acceleration α and the acceleration change rate α' are successively input one at a time at the acceleration/deceleration processing unit 102 to process the position commands for acceleration or deceleration. The values obtained from the closed loop transfer function $G_{BP}$ of the position loop are compared with the actual positions and it is judged if the differences are within a predetermined range.

Such processing is performed successively until "n" sets so as to extract the sets with the above differences within a predetermined range. Then, from such sets, the sets with a rate of change of acceleration α' of a predetermined value or less are extracted. This is because if the rate of change of the acceleration is large, shaking, vibration, etc. occur at the numerical control machine tool 10, so such cases are excluded. Finally, from the extracted sets, the set with the shortest time TA is selected and is set as the acceleration/deceleration parameters.

Figure 14:
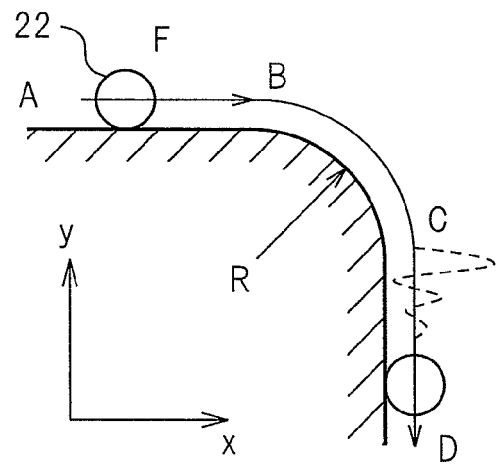
FIG. 14 A view which shows one machining path of a tool of a machine tool.

Furthermore, FIG. 14 is a view which shows one machining path of a tool of a machine tool. In FIG. 14, the tool 22 is shown moving from one straight path AB through the arc path BC to the other straight path CD. The radius of the arc path BC is made "R". Such a machining path is found by analyzing the NC program 42. Further, the broken line shows enlarged the actual path when the machine operates for this machining path.

Figure 15A:
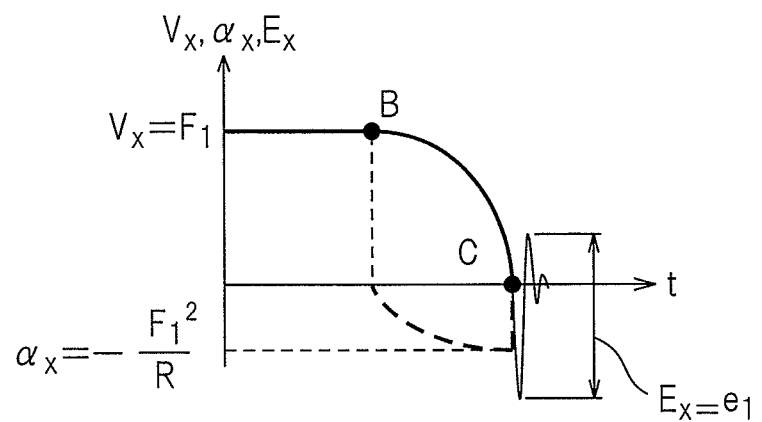
FIG. 15A A view which shows the relationship of an X-direction velocity, X-direction acceleration, and X-direction error with time in FIG. 14.
Figure 15B:
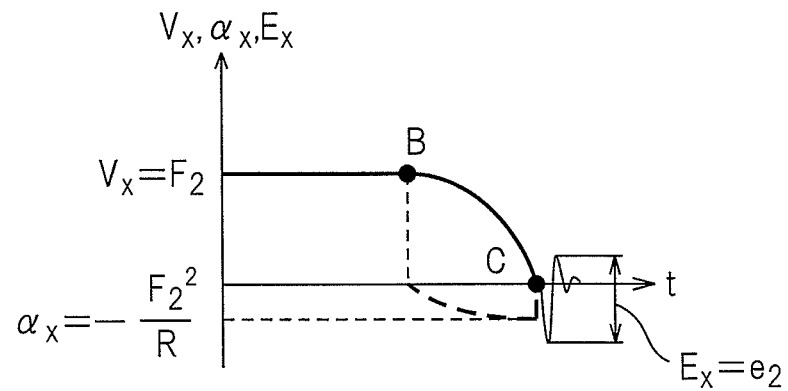
FIG. 15B A view which shows the relationship of an X-direction velocity, X-direction acceleration, and X-direction error with time in FIG. 14.

Further, FIG. 15A and FIG. 15B are views which show the relationships of the X-direction velocity, X-direction acceleration, and X-direction error at FIG. 14 with time. In FIG. 15A and FIG. 15B, the waveforms show the results found by simulation. FIG. 15A shows the state where the velocity $V_X$ is relatively large ($F_1$), so the acceleration $\alpha_X$ is also large ($-F_1^2/R$) and, as a result, the error $E_X$ at the point C is also large ($e_1$). On the other hand, FIG. 15B shows the state where the velocity $V_X$ is relatively small ($F_2$), so the acceleration $\alpha_X$ is also small ($-F_2^2/R$) and, as a result, the error $E_X$ at the point C is also small ($e_2$).

If, like in FIG. 15A, the velocity ($F_1$) is large, the large acceleration at the point C ($-F_1^2/R$) instantaneously disappears, so a large error ($e_1$) occurs, the actual path in FIG. 14 becomes disturbed, vibration occurs at the machine tool, and machining defects occur at the workpiece. If, as shown in FIG. 15B, the error ($e_2$) is small, vibration will not occur in the machine tool and the workpiece will not suffer from machining defects.

Therefore, in the flow chart which is shown in FIG. 16, a suitable velocity $V_X$ is found so that the disturbance of the actual path becomes within an allowable value, and the threshold parameter of the acceleration ($F^2/R$) which is included in the acceleration/deceleration processing unit 102 of FIG. 2 and which is calculated from the radius R and the command velocity F is automatically determined. At step S31, a predetermined initial value $F_0$ and a radius R (fixed value) are set for the command velocity F and the radius R which are shown in FIG. 14. Then, a position command relating to the X-axis of step S32 is prepared. Then, at step S33, that position command is input for the position command of the position control unit 60 of FIG. 3 and the error (position command–actual position) is simulated. At step S34, it is judged if the error ($E_X$) at the point C is the allowable value or less. If, as a result, the error is still larger than the allowable value ($e_2$), ΔF which is set in advance at step S35 is subtracted from the F ($F_{old}$) which was used at step S32 to obtain the F which is used at the next step S32, and steps S32 and S33 are repeated. If, at step S34, the error becomes the allowable value ($e_2$) or less, at step S36, the threshold parameter ($=F^2/R$) which is included in the acceleration/deceleration processing unit 102 of FIG. 2 is calculated by the current F and set.

In this way, the acceleration/deceleration parameters which are set at the acceleration/deceleration processing unit 102 of FIG. 2 become suitable for the state of the feed axes. Further, the position control unit 60 is used for calculation by simulation without actually operating the machine tool, so it is possible to find the optimal acceleration/deceleration parameters in a short time.

Furthermore, FIG. 12 is a flow chart which shows the processing for judging for abnormalities based on a control parameter. As shown in FIG. 12, at step S21, it is confirmed which control parameter the control parameter which was calculated by the present invention is.

Then, at step S22, the set of the threshold values which are preset for that control parameter is read from a storage unit (not shown). The set of threshold values is determined by experiments etc. and includes a first threshold value and a second threshold value which is larger than the first threshold value. These threshold values are made different in accordance with the type of the workpiece W to be machined, the mass of the tool, etc.

Further, at step S23, it is judged if the control parameter is larger than the first threshold value. If larger, the routine proceeds to step S24 where the operator is issued a visual or auditory warning. Further, at step S25, it is judged if the control parameter is larger than the second threshold value. If larger, the routine proceeds to step S26 where the numerical control machine tool 10 itself is made to stop.

As explained above, in the present invention, a plurality of types of control parameters are obtained. Further, these control parameters are used as indicators of judgment for abnormalities. Therefore, it is possible to judge the presence of abnormalities uniquely in accordance with the different control parameters.

For example, when the control parameter is the resonance filter constant of the vibration suppression filter 100, it is possible to judge there was a drop in rigidity of a feed axis. The reason is that if the preload of the ball screw device which forms the feed axis falls, the rigidity of the feed axis also falls. Of course, when selecting other control parameters, it is possible to perform other types of judgments for abnormalities.

Therefore, in the present invention, it is possible to use the plurality of types of optimized control parameters for judgment for abnormalities in a multifaceted manner and as a result possible to raise the reliability of the judgment for abnormalities. Furthermore, in the present invention, since such judgment for abnormalities can be performed automatically, the load on the operator can be lightened. It is also possible to make the numerical control method of the present invention be automatically run at the time of powering up a machine tool and check the status of the machine tool from the daily changes in optimized control parameters.

Figure 13A:
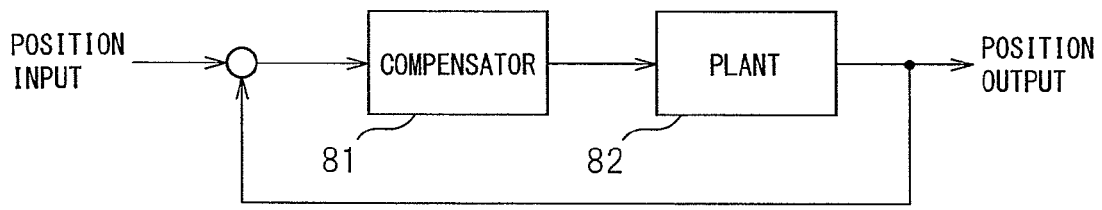
FIG. 13A A view which simply shows a position loop.

In this regard, FIG. 13A is a view which simply shows a position loop. In FIG. 4, at step S1, when finding the closed loop transfer function $G_{BP}$ of the position loop, the position commands of the machine tool which are shown in FIG. 13A are maintained in amplitude while changed in frequency and input in, for example, the range of 10 Hz to 1000 Hz. Further, the output which passes through the compensator 81 and plant 82 is detected by a scale or servo motor encoder. Then, the input and the output can be transformed by Fourier transforms and the ratio of the same found so as to find the transfer function $G_{BP}$.

Figure 13B:
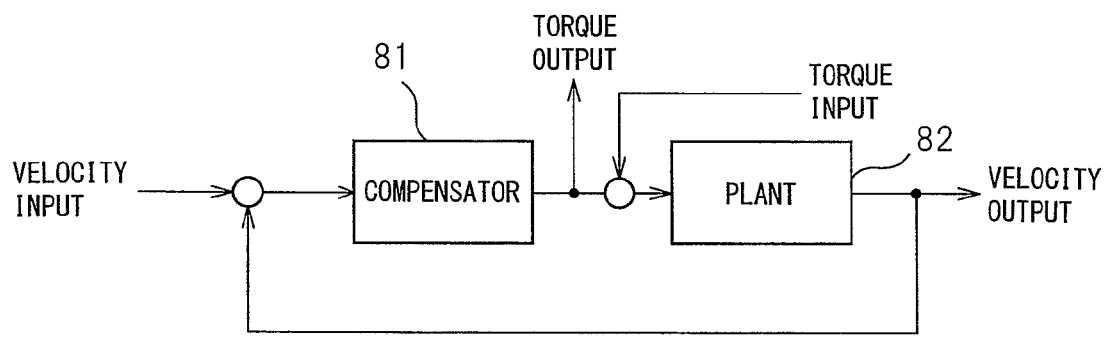
FIG. 13B A view which simply shows a velocity loop.

In the same way, FIG. 13B is a view which simply shows a velocity loop. In FIG. 8, at step S11, when finding the velocity loop transfer function $G_{BV}$ of the velocity loop, the servo motor is operated as shown in FIG. 13B, and the torque is maintained in amplitude while changed in frequency and, for example, input in the range of 10 Hz to 1000 Hz. Further, the output which passes through the compensator 81 and the plant 82 is detected by the torque detector etc. Then, the input and the output can be transformed by Fourier transforms and the ratio of the same found so as to find the transfer function $G_{BV}$. Note that, of course, instead of the torque, the velocity may also be directly input.

In this way, the time required for inputting position commands etc. while changing the frequency between for example 10 Hz to 1000 Hz in range is several seconds. Further, in such work, it is not necessary to actually operate the machine tool. For this reason, it will be understood that the transfer functions $G_{BP}$ and $G_{BV}$ can be calculated in an extremely short time. Furthermore, the plant 82 usually includes models of machine tools and error, for example, conversion delay at the time of analog-digital conversion. In the present invention, various types of judgments are made through the transfer functions $G_{BP}$ and $G_{BV}$, so it will be understood that results closer to the actual operation of the machine tool are obtained.

The invention claimed is:

1. A numerical control method which uses a servo control unit to drive a feed axis of a machine tool, the numerical control method comprising steps of:
    measuring at least one of a closed loop transfer function $G_{BP}$ of a position loop, which is found from a ratio of a position command and an actual position, and a closed loop transfer function $G_{BV}$ of a velocity loop, which is found from a ratio of a velocity command and an actual velocity, at the servo control unit of the machine tool by using a frequency response of the feed axis;
    finding at least one of a function of a control coverage $P_p$ of the position loop and a function of a control coverage $P_v$ of the velocity loop by using the measured closed loop transfer functions $G_{BP}$, $G_{BV}$;
    finding at least one of a modeling error $\Delta P_p$ of the position loop and a modeling error $\Delta P_v$ of the velocity loop from the control coverages $P_p$, $P_v$; and
    calculating, as a control parameter, a position proportional gain $K_{pp}$ of the position loop from the closed loop transfer function $G_{BP}$ of the position loop and the modeling error $\Delta P_p$ of the position loop and/or calculating, as a control parameter, a velocity proportional gain $K_{vp}$ of the velocity loop and an integral gain $K_{vi}$ from the closed loop transfer function $G_{BV}$ of the velocity loop and the modeling error modeling error $\Delta P_v$ of the velocity loop, so that the feed axis of the machine tool is set with the calculated control parameters,
    wherein reciprocals of the closed loop transfer functions $G_{BP}$, $G_{BV}$ are shifted in a direction in which a frequency of the frequency response increases so as to approach to the modeling errors $\Delta P_p$, $\Delta P_v$, respectively, and the position proportional gain $K_{pp}$, the velocity proportional gain $K_{vp}$, and the integral gain $K_{vi}$ are calculated so that the reciprocals of the closed loop transfer functions $G_{BP}$, $G_{BV}$ do not cross the modeling errors $\Delta P_p$, $\Delta P_v$, respectively.

2. The numerical control method as set forth in claim 1, which uses the modeling error $\Delta P_p$ of the position loop to find a feed forward gain $G_{VF}$ of the position loop as a control parameter or uses the modeling error $\Delta P_v$ of the velocity loop to find a feed forward gain $G_{AF}$ of the velocity loop as a control parameter.

3. The numerical control method as set forth in claim 1, wherein the modeling error $\Delta P_v$ of the velocity loop is extracted from a relationship between the gain of the control coverage model $Pv_0$ of the velocity loop and the frequency,
    a resonance filter constant for reducing the gain by applying a vibration suppression filter to a frequency region, where the modeling error $\Delta P_v$ is concentrated, is used as a control parameter.

4. The numerical control method as set forth in claim 1, which
    finds the closed loop transfer function $G_{BP}$ of the position loop in the servo control unit of the machine tool,
    inputs a plurality of sets which include at least predetermined accelerations a of the feed axis and times TB for the acceleration α to change from zero to a certain value in the closed loop transfer function $G_{BP}$ of the position loop, and
    selects as acceleration/deceleration parameters one set which includes at least acceleration α and time TB from the plurality of sets so that an error between a position command and an actual position of the feed axis becomes a desired value or less.

5. The numerical control method as set forth in claim 1, which compares one of the calculated control parameters and a predetermined threshold value for that control parameter and issues a warning when the control parameter is the threshold value or more.

* * * * *